Patented July 17, 1928.

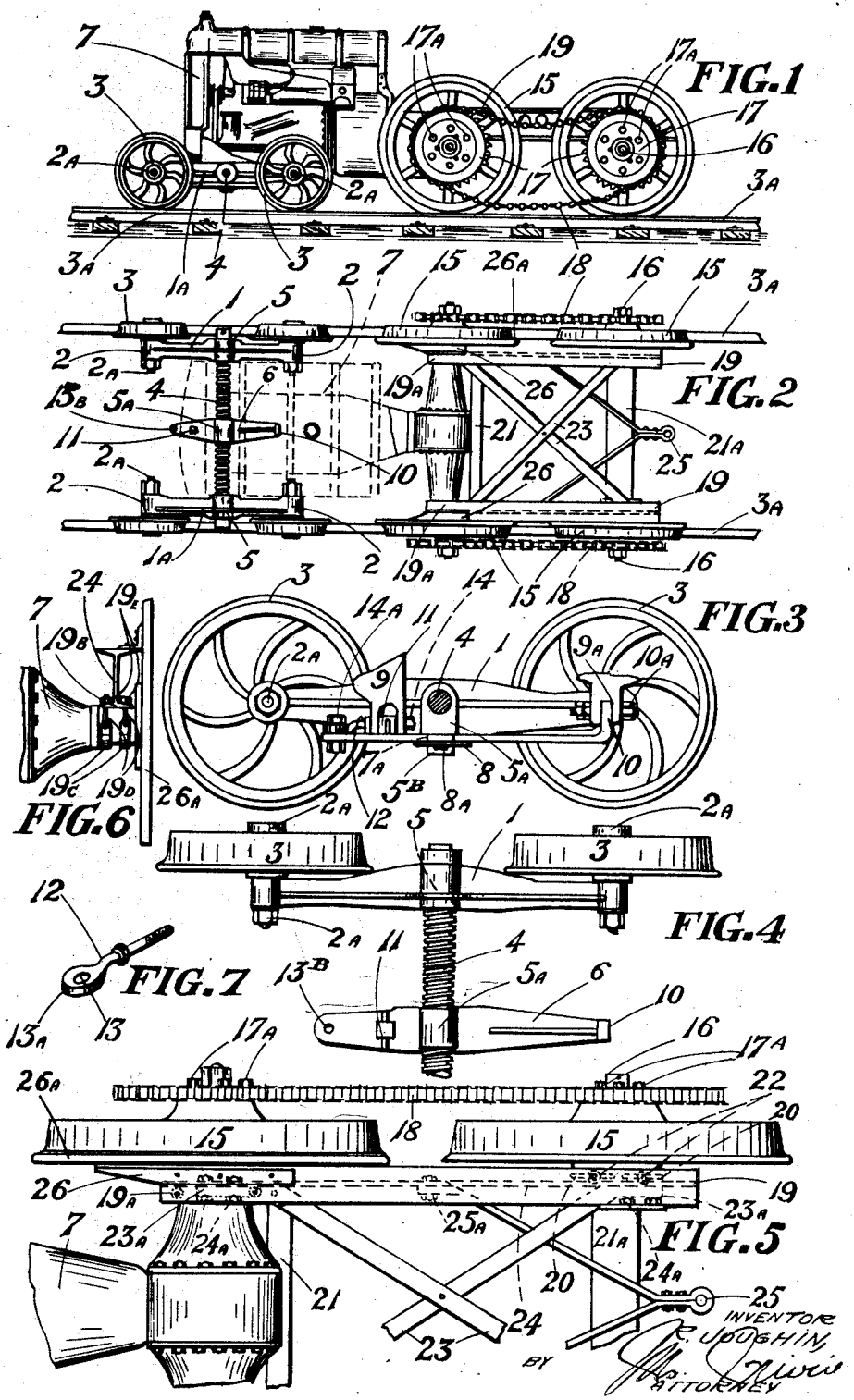

1,677,184

UNITED STATES PATENT OFFICE.

ROBERT JOUGHIN, OF WAIKINO, NEW ZEALAND.

MEANS FOR ADAPTING MOTOR TRACTORS FOR HAULAGE PURPOSES ON RAIL OR TRAM LINES.

Application filed November 20, 1925. Serial No. 70,351.

This invention relates to a four wheeled flexible bogie which in one form is adapted to be attached to the front of a tractor, and in another form provide a flexible drive at the back of the tractor; the whole comprising an eight wheeled motor locomotive for hauling purposes on all classes of tram lines.

The object of the invention is to apply suitably constructed flexible trucks to the fore and rear of a tractor without necessitating any alteration to the tractor, and so maintain to advantage the differential gear equally as well as for road traction.

A further object is to apply any suitable number of driving wheels to the rear of the tractor for the purpose of obtaining a maximum of gripping power on the rails.

Referring to the accompanying drawings:—

Figure 1 is a side elevation of a tram line motor locomotive showing a Fordson tractor equipped with the said fore and rear trucks.

Figure 2 is a plan of Figure 1, the main body of the tractor being shown in broken lines to more clearly show the front truck.

Figure 3 is a side elevation of portion of the front truck, one pair of track wheels and portion of the threaded connecting cross bar between each opposite pair of wheels being omitted.

Figure 4 is a plan of Figure 3.

Figure 5 is a plan of portion of the rear truck showing how a drive is established between each pair of driving wheels, one pair of wheels and portion of the truck frame being omitted.

Figure 6 is an end elevation of portion of the rear axle housing, showing means for attaching the rear truck to the tractor, the driving wheels being omitted.

Figure 7 is a perspective view of the eye bolt used in attaching the front truck to the fore part of the tractor.

The steering gear with the front axle and wheel assembly is abandoned while also are the ordinary rear tractor wheels.

Describing first the front truck; there are two link members 1 and 1ᴬ, at each of the extreme ends of which is fashioned a boss like portion 2 having a suitably dimensioned hole therein, for the application of a journal pin 2ᴬ, on which is mounted a track wheel 3 of suitable diameter, the said link members 1 and 1ᴬ being parallel with the rails when in a normal position on a straight track. By this arrangement there will be four wheels on the front truck, two wheels being on each rail 3ᴬ.

The two link members 1 and 1ᴬ with the track wheels attached, are spaced a suitable distance apart to suit the gauge of tram line, and are adapted to be secured together by means of a threaded cross bar or screw 4.

At or near the middle portion of each link member 1 and 1ᴬ is a boss like portion 5, similar to those at either end of the said link members 1 and 1ᴬ, and having holes therein suitably adapted for securing the said link members 1 and 1ᴬ to the ends of the screw member 4. The screwed member 4 may be screwed the entire length thereof, or it may take the form of a distance bar between the link members 1 and 1ᴬ and be secured thereto. There is an internally threaded nut 5ᴬ adapted to fit the said threaded portion 4, having a pin 5ᴮ fashioned integral with the said internally threaded nut 5ᴬ to provide a pivot on which the front truck may turn freely to take bends in the line.

A cast metal link or bar 6 is secured to the fore part of the tractor, being retained in a position axially with the tractor, and having a hole 7ᴬ machined therein as indicated by broken lines in Figure 3, for engagement with the pin portion 5ᴮ of the nut 5ᴬ to be pivotally retained therein by means of a washer 8 and cotter pin 8ᴬ.

Cast integral with the fore part of the Fordson tractor are projecting lugs 9 and 9ᴬ indicated in Figure 3; the front pair of lugs 9 are used under ordinary circumstances for pivoting the front axle of the vehicle, while the pair of lugs 9ᴬ are used for attaching the radius rod for support of the axle. In this invention the lugs 9 and 9ᴬ are utilized for the purpose of securing the front truck to the tractor, and as illustrated in Figure 3, a vertically projecting lug 10 at one end of the bar 6, is suitably dimensioned to fit between the said lugs 9ᴬ and be retained there by means of a bolt 10ᴬ passing through holes in the said lugs, and also through a hole in the vertically projecting lug 10.

Considering now the opposite end of the bar 6; another vertically projecting lug 11 suitably dimensioned to fit the cavity formed by the foremost pair of lugs 9 is adapted to be retained therein by means of an eye bolt 12 indicated in Figures 3 and 7. The said eye bolt 12 has a hole 13 fashioned in the round disc like portion 13$^A$ to coincide with a similarly dimensioned hole 13$^B$ at the end of the bar 6, so that when the said eye bolt is passed through a hole in the said lugs 9 and the vertically projecting lug 11, the whole will be retained securely by application of the nut 14 and a bolt 14$^A$ passing through the holes 13 and 13$^B$.

The back truck consists of four driving wheels 15 preferably of larger diameter than those of the front bogie; one pair being mounted on the rear axle in place of the ordinary road or cultivator wheels, while the other pair is mounted on the stub axles 16 securely attached to the back carriage frame to be independent of the top longitudinal beams to be referred to later. There are four sprockets 17 secured by studs 17$^A$ to the external faces of each driving wheel and a roller chain 18 on each side of the rear carriage couples each pair of sprockets 17 together to form a four wheel drive. By this arrangement a flexible drive is established which when taking a curve on the track will have the full functioning of the differential gear obtained by road vehicles.

There is a steel frame, or if desired a wooden frame, for supporting the rear pair of wheels to the body of the tractor. Two steel beams 19, or pieces of channel steel if preferred, are positioned longitudinally with the track, the end 19$^A$ of each having holes in the bottom flange 19$^B$ for strap bolts 19$^C$ which pass round the rear axle housing and extend upwards, the threaded portion 19$^D$ passing through the holes in the said flange 19$^B$ to be retained securely by application of the nuts 19$^E$ as indicated in Figure 6.

Indicated in Figure 5 by broken lines are the slots 20, positioned near the opposite end of the said beams 19 being fashioned in the said bottom flange 19$^B$, there being two slots in each beam. Two cross bars 21 and 21$^A$ are positioned at right angles to the main beams 19, the former bar 21 being in position near the front end of the rear carriage adjacent to the differential housing, and the ends of the said bar 21 being secured to the longitudinal beams 19 by rivets or similar retaining means. The second cross bar 21$^A$ is positioned at or near the external ends of the beams 19, and may be a steel beam of smaller section than the beams 19, having slidable retaining means which may take the form of similar strap bolts to those indicated in Figure 6 for attaching the frame of the rear carriage to the tractor.

The said strap bolts will pass round the beam or cross bar 21$^A$ in a similar manner to that of the former case in which the said bolts passed round the rear axle housing to pass vertically through the holes in the flange of the beam positioned above. In this case the threaded portion 19$^D$ of the strap bolts will pass up through the slotted holes 20 in the bottom flange 19$^B$ of the beams 19 when by the application of the nuts 22 the cross bar or beam 21$^A$ with the rear wheels attached may be secured in any position in the said slots.

If preferred ordinary bolts may be used instead of the strap bolts referred to, the said bolts passing through holes in the top flanges of the cross bar or beam 21$^A$ and thence through the slots 20 in the bottom flange 19$^B$ of the beams 19 to retain the two beams in position. By this arrangement, the cross beam 21$^A$ with the rear wheels mounted upon their respective stub axles 16 may be slidable in the slots 20 in order that the desired amount of tension on the roller chains 18 may be obtained. Two struts 23 positioned diagonally are attached at their ends 23$^A$ to the web 24 of the beams 19 by means of the bolts 24$^A$. A draw bar 25 is also secured by bolts 25$^A$ to the web 24 of each beam 19 to provide means for attaching subsequent trailers or trucks. Riveted to the fore end of the rear carriage on the beam 19 are strips of angle iron 26 to which are in turn riveted or otherwise secured the metal shields 26$^A$ which enshroud the inside faces of each driving wheel situated on the rear axle to provide protection.

What I claim as new and desire to secure by Letters Patent is:—

1. Improved means for adapting a motor tractor for haulage purposes on rail or tram lines, comprising the application of fore and rear trucks to the frame of the tractor, the said trucks having four flanged track wheels attached thereto, and means for operating all rear truck wheels to propel the tractor.

2. Improved means for adapting a motor tractor for haulage purposes on rail or tram lines, including flexible front trucks comprising two link members, a boss portion on each end thereof, a hole in each boss, in which a pin is adapted to fit and upon which pin is mounted the front flanged track wheel; and a threaded cross bar adapted to secure the link members together on each side of the frame of the tractor.

3. Improved means for adapting a motor tractor for haulage purposes on rail or tram lines, including link members having a centrally disposed boss portion, a hole in each boss through which the ends of a threaded cross bar are passed and secured, an internally threaded nut adapted to fit the said threaded cross bar, a pin fashioned integral of each threaded nut, a cast metal link secured to the front part of the tractor, a hole in said metal link for engagement with the pin portion of the threaded nut, a washer member, and a cotter pin, such parts providing a pivot upon which the front truck of the tractor may turn.

4. An improved method for adapting a motor tractor for haulage purposes on rails including a front truck, means carried by the tractor and having swivelled connection with the truck, a four wheeled rear truck, and means for driving all wheels of the rear truck from the tractor.

5. An improved means for adapting a motor tractor for haulage purposes on rails, comprising a front truck, a supporting bar having swivelled connection with the truck, means carried by said bar to cooperate with and secure a tractor thereto, and a four wheeled rear truck, and means operated from the tractor to drive all wheels of said rear truck to provide a driving force for the tractor.

6. An improved means for adapting a motor tractor for haulage purposes on rails, comprising a front truck, a supporting bar having swivelled connection with the truck, means carried by said bar to cooperate with and secure a tractor thereto, and a rear truck operated from the tractor to provide a driving force, said rear truck including four track wheels connected in pairs for driving purposes.

In testimony whereof I have signed my name to this specification.

ROBERT JOUGHIN.